(12) United States Patent
Bertin et al.

(10) Patent No.: US 9,996,689 B2
(45) Date of Patent: Jun. 12, 2018

(54) SECURE ELEMENT FOR A TELECOMMUNICATIONS TERMINAL

(71) Applicant: IDEMIA FRANCE, Colombes (FR)

(72) Inventors: Marc Bertin, Colombes (FR); Nicolas Bousquet, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days. days.

(21) Appl. No.: 14/254,869

(22) Filed: Apr. 16, 2014

(65) Prior Publication Data

US 2014/0317721 A1  Oct. 23, 2014

(30) Foreign Application Priority Data

Apr. 17, 2013  (FR) .................................. 13 53491

(51) Int. Cl.
*G06F 21/53* (2013.01)
*G06Q 20/32* (2012.01)
*H04L 29/06* (2006.01)
*H04W 12/12* (2009.01)
(Continued)

(52) U.S. Cl.
CPC .............. *G06F 21/53* (2013.01); *G06F 21/77* (2013.01); *G06Q 20/3227* (2013.01); *G06Q 20/3229* (2013.01); *G06Q 20/363* (2013.01); *H04L 63/0853* (2013.01); *H04W 12/12* (2013.01)

(58) Field of Classification Search
CPC ....... G06F 21/53; G06F 21/77; G06Q 20/363; G06Q 20/3229; G06Q 20/3227; H04W 12/12; H04L 63/0853
See application file for complete search history.

(56) References Cited

U.S. PATENT DOCUMENTS

| 8,429,409 B1* | 4/2013 | Wall ..................... H04W 12/04 713/172 |
| 8,712,407 B1* | 4/2014 | Cope ...................... H04W 4/00 455/41.1 |
| 2005/0055588 A1* | 3/2005 | Nalawadi et al. ............ 713/300 |

(Continued)

FOREIGN PATENT DOCUMENTS

TW     200816068 A     4/2008

OTHER PUBLICATIONS

European Search Report dated Jan. 17, 2014 from French Patent Application No. 1353491 filed Apr. 17, 2013 pp. 1-2.
(Continued)

*Primary Examiner* — Hadi S Armouche
*Assistant Examiner* — Cheng-Feng Huang
(74) *Attorney, Agent, or Firm* — MH2 Technology Law Group, LLP (57) ABSTRACT

A secure element, for example an improved SIM card or the like, for a telecommunications terminal, such as a mobile telephone. The secure element may implement a trusted services management application, for example, by executing the trusted services management application on a secure processor. The trusted services management application may manage at least one trusted application to be run by the telecommunications terminal, where trusted applications are used for functions requiring a high level of security such as payment, the supply of "premium" content, which may be certified or guaranteed, or guaranteeing the integrity of the terminal.

18 Claims, 5 Drawing Sheets

(51) Int. Cl.
*G06Q 20/36* (2012.01)
*G06F 21/77* (2013.01)

(56) References Cited

U.S. PATENT DOCUMENTS

| | | | |
|---|---|---|---|
| 2008/0011833 A1* | 1/2008 | Saarisalo | 235/382 |
| 2008/0098478 A1* | 4/2008 | Vaidya et al. | 726/24 |
| 2009/0103732 A1* | 4/2009 | Benteo et al. | 380/270 |
| 2009/0119776 A1* | 5/2009 | Palnitkar | G06Q 20/40 726/25 |
| 2009/0247078 A1* | 10/2009 | Sklovsky | H04L 67/16 455/41.1 |
| 2010/0100930 A1* | 4/2010 | King | 726/1 |
| 2010/0145854 A1 | 6/2010 | Messergers et al. | |
| 2010/0306107 A1 | 12/2010 | Nahari | |
| 2012/0238206 A1 | 9/2012 | Singh et al. | |
| 2012/0304254 A1* | 11/2012 | Musfeldt | H04L 9/3234 726/2 |
| 2013/0151400 A1* | 6/2013 | Makhotin | G06Q 20/3227 705/39 |
| 2014/0058937 A1* | 2/2014 | Watson | G06Q 20/204 705/41 |

OTHER PUBLICATIONS

Taiwanese Office Action and Search Report dated Nov. 21, 2017 in TW Application No. 103113325 (with translation), 20 pages.

\* cited by examiner

SECURE ELEMENT FOR A TELECOMMUNICATIONS TERMINAL

CROSS-REFERENCE TO RELATED APPLICATIONS

This application claims priority to French Patent Application No. 1353491 filed Apr. 17, 2013, the entire disclosure of which is hereby incorporated by reference in its entirety.

TECHNICAL CONTEXT

The disclosure of the present document lies in the field of telecommunications terminals suitable for communicating via a telecommunications network such as a mobile telephony network or the Internet.

In this field, mobile or fixed terminals are known that include a secure element, and in certain circumstances also a secure execution environment.

The secure element is an electronic assembly comprising at least a microprocessor and a memory and it is designed to be safe both in software terms and in hardware terms, and in particular to be capable of withstanding physical attacks. For example it may comply with the Common Criteria standard or with the federal information processing standard (FIPS) 140. It may be removable, e.g. when in the form of a subscriber identity module (SIM) card, or it may constitute a non-removable portion of the terminal (e.g. an embedded secure element). It has the ability to execute specific programs, and the user has little direct access to its functions.

When present, the secure execution environment is in the form of a trusted zone specific to the terminal and protected in software terms, since only applications coming from accredited publishers are installed and executed therein, which applications are used for functions requiring a high level of security such as payment, the supply of "premium" content, which may be certified or guaranteed, or guaranteeing the integrity of the terminal. These functions define trusted services delivered by a supplier to the user of the terminal. These functions are performed by trusted applications running in the secure environment. The secure execution environment is capable of securely controlling the screen and the user interface (e g. a virtual or a real keyboard) of the terminal. Trusted applications are obtained from suppliers (or publishers) of trusted applications, also known as trusted service suppliers.

The secure environment may be accompanied on the terminal by a versatile execution environment forming an environment that is open and multifunctional. The applications executed in the versatile environment may call on applications that are executed in the secure environment.

This category of terminals includes intelligent mobile telephones, touch tablets, microcomputers, and stand-alone intelligent systems, e.g. on board computers.

The hardware and software means for communicating with the network, which may use a telephony standard such as the global system, for mobile communications (GSM) standard or the third generation (3G) standard, or a local communications standard such as WiFi, or indeed Internet, protocol (IP), may operate within the context of the versatile execution environment, or outside it and also outside the secure execution environment.

In order to manage trusted applications run in the secure environment, trusted service manager servers are connected to the network and used by trusted applications suppliers. On a given terminal, a trusted application may be managed as a function of rights acquired by the user of the terminal or as a function of other events, by an action who is remote from the trusted service manager server that is being interrogated by the terminal. The trusted service manager server may also keep a log of information relating to the use of trusted applications issued by the publisher, possibly including information about mode of utilization, such as the frequency with which payment decisions are taken and the number of payment decisions that have been taken in a series of utilizations. Since the management server is present on the communications network, management is Performed remotely, with this sometimes being referred to as "over the Internet" (OTI). If communication over the network is not available, or is not available with sufficient bandwidth, then management is held in check. Likewise, if communication via the network does not provide a sufficient level of trust, for example because an operator of the network is not trustworthy, it may be dangerous to use OTI management.

The invention seeks to propose a novel terminal architecture that is capable of managing trusted service applications even in the event of a network connection being unavailable.

SUMMARY OF SEVERAL EMBODIMENTS

The invention thus proposes a secure element for a telecommunications terminal, the element including means or running a trusted service management application to manage at least one trusted application of the telecommunications terminal, and also a telecommunications terminal running the trusted application and including a secure element as described.

By means of these principles, it is possible to increase the security and the reliability with which trusted applications are managed. Management may even be performed in the absence of a network connection, and may be performed while protected from potential security breaches present on a network that is not controlled or that have reached, the interface for communication with the network of the terminal, in particular if it is perforated outside a secure execution environment, as is often the case.

The invention also proposes a switching function that switches a request for management of the trusted application to the trusted service management application or to a remote trusted service management server. Depending on the request, on the state of the terminal, or on the state of the network, and depending on rules, the switching function makes it possible to determine whether management is to be performed locally or remotely and thereby increases the reliability and the security of the process of managing trusted applications.

The trusted services management application may be configured to send an activity report to the remote trusted service manager server, thereby likewise contributing to reliability.

The terminal may have network communication means run in an execution environment that is distinct from the execution environment in which the trusted application is run, thereby imparting a secure nature to the execution environment in which the trusted application is run.

The invention also provides a method of managing a trusted application, which method is performed by a telecommunications terminal, the method comprising a stop of receiving, by a secure element, an authorization request for a management action as issued by a trusted applications manager client of the terminal, a verification step performed by the secure element for verifying a security policy relaying to the management action, a step of transmitting, by the secure element, a response to said trusted applications manager client, which response, if positive, includes a cryptographic key, and a step of performing, by said trusted applications manager client, the management action with the help of the cryptographic key. This method, which relates to an implementation of the invention concerning management, e.g. of the type comprising installing, activating, unblocking, updating, personalizing, suppressing, deactivating, or blocking the trusted application, provides the above-mentioned advantages, namely an improvement in the reliability and the safety with which trusted applications ore managed.

In addition to such management actions, the invention also relates to management actions of the type involving selecting information about an activity of the trusted application. The invention also relates to the user personalizing a trusted application, in particular the secure operating system itself, in the context of a service for guaranteeing the integrity of the terminal.

DETAILED DESCRIPTION

Figure 1:
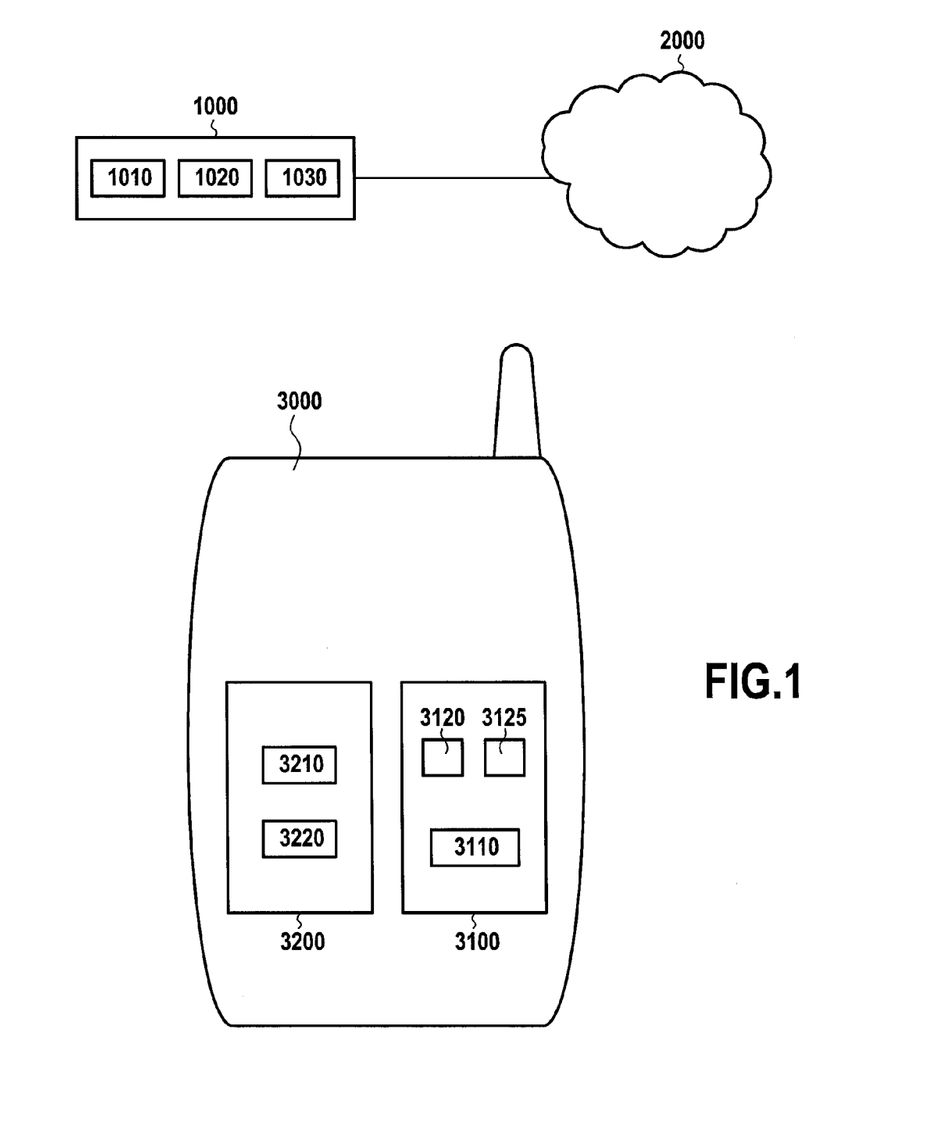
FIG. 1 shows an example of a system including trusted application management.

FIG. 1 shows an example of a system including trusted service management provided by a trusted applications supplier. The management may be performed for example under the control of the supplier of the trusted applications, which may be a telecommunications network operator or Which may be a distinct entity. Each trusted application is associated with a trusted service.

A management server 1000 of the trusted applications supplier is accessible by a terminal 3000 via the network 2000, which may be a mobile telephony network or an IP network such as the Internet, or network that is a combination of both, such as a fourth generation (4G) network. Since it is accessible on the network, the server 1000 is referred to as a "remote" server. The remote management server 1000 includes security rules 1010, cryptographic keys 1020, and possibly the code 1030 of a trusted application suitable for being downloaded to the terminal 3000.

By way of example, the terminal 3000 is a mobile telephone such, as a smartphone, or possibly a tablet fitted with a WiFi interface or with a wired connection to the Internet, or it may be a microcomputer, or it may be an autonomous intelligent system. In the embodiment shown, it has two execution environments, one being a secure execution environment 3200 having a secure operating system, and the other being a versatile execution environment 3200 having a versatile operating system.

The secure operating environment 3100 may be run with the help of a secure processor (not shown), which may be a processor dedicated to this task or which may have other functions, and with the help of a secure rewritable non-volatile memory (not shown), and it is based on a trusted operating system (not shown). The trusted operating system may include a secure start mechanism that verifies that the terminal 3000 is starting in a trusted state, e.g. by verifying the integrity of the code being executed, in particular the code of the secure operating system 3100. The secure operating system 3100 starts while no other operating system that has started yet. The integrity of the secure rewritable non-volatile memory may be verified, for example, with the help of encryption techniques and fingerprint verification (hashing function). Because of the secure execution environment 3100, it is possible to store sensitive data in the terminal 3000. In order to retain the secure nature of the secure execution environment 3100, only trusted applications coming from trusted (or certified) sources over which the user has no control are installed in the memory of this environment and are executed under the control of its operating systems. Software and hardware protection protects the trusted applications from applications run in the versatile environment.

For example, an application for inputting a confidential code (which may be a personal identification number (PIN) or a code for temporary use) may be installed in the secure environment and may constitute a rusted application.

In certain embodiments, the trusted applications run in the secure execution environment may have access to all of the functions made available by the main processor and memory of the terminal.

The secure execution environment 3100 includes a trusted applications manager client 3110 together with codes for executing trusted applications 3120 and 3125, e.g. applications for a payment service, for a content management service, or for a service for managing the integrity of the terminal.

The trustee applications manager client 3110 constitutes the relay between the remote management server 1000 and the trusted applications 3120 and 3125.

The versatile execution environment 3200 runs an application 3210 for the versatile environment, such as a web browser or an application of some other type, such as a standard application, for example. This application may have an associated icon in the display managed by the versatile execution environment. The versatile execution environment 3200 also runs a mobile telephony transceiver 3220, e.g. using GSM or 3G, and as a function of the type of network, it may be replaced by or associated with an IP network interface.

Thus, in the embodiment described, the network communications means 3220 for establishing a connection with the telecommunications network 2000 are run in an execution environment that is distinct from the secure execution environment 3100, thereby contributing to making it secure.

When the application 3210 for the versatile environment requests access to the services of a trusted application 3120, 3125, or 1030, it communicates with the trusted applications manage client 3110, that consults a list associated with each entry about a trusted application that can be executed in the secure environment 3100 in order to examine the state or the status of the application and in order to determine whether it can be used in compliance with the request from the application 3210.

If not, the manager client 3110 communicates with the remote server 1000 via the interface 3220 executed in the environment 3200, and also via the network 2000, to obtain a management action performed by the trusted applications supplier that supplied the application in question.

The management action comprises reading the rights of the user of the terminal in a right database, possibly making the code of the application 1030 available to the terminal, or obtaining agreement to activate or unblock the application in question 1030, 3120, or 3125. Obtaining such an agreement may involve verifying the rules 1010 and the management action may involve using cryptographic keys 1020 in order to activate the application. A key is transmitted to the trusted applications manager client 3110, which proceeds to perform encryption or decryption with the key.

Whatever the state of the trusted application in question, an application management action performed by the remote trusted service manager server 1000 may also consist in storing the activity or an activity type relating to the trusted application, when it is actuated, so as to keep a journal of transactions or of activity, and so as to enable the trusted applications supplier to keep statistical records about activity associated with the application or activity associated with the user of the terminal.

Figure 2:
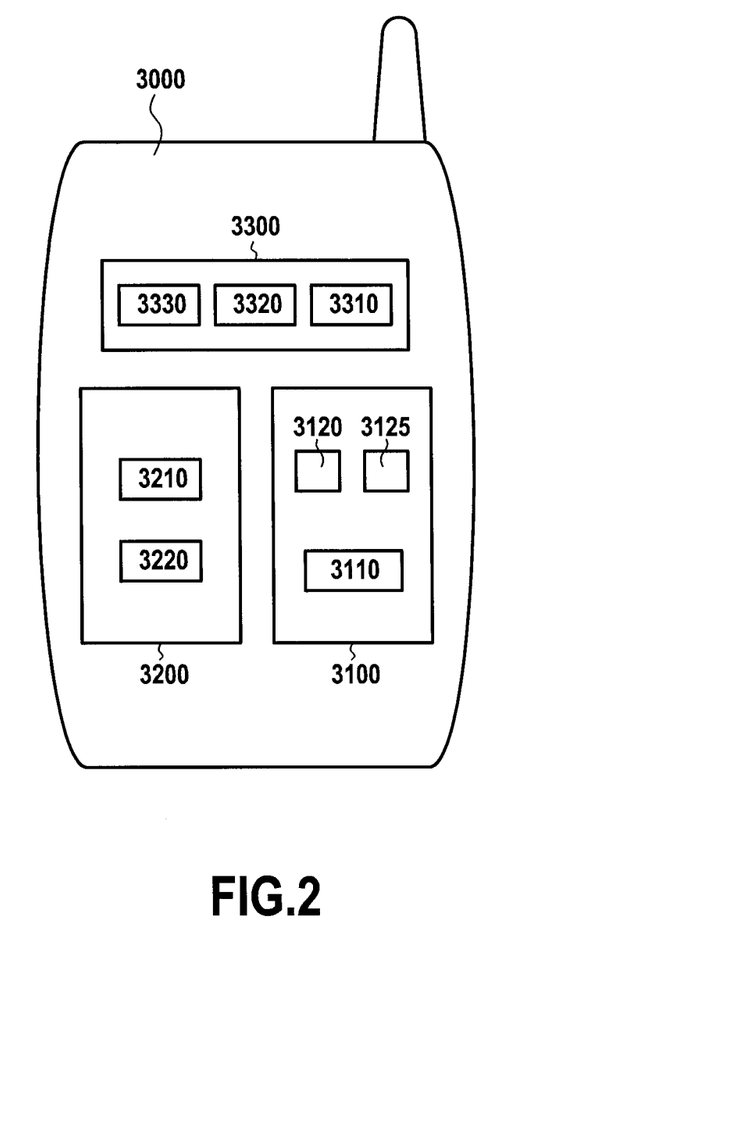
FIG. 2 shows an embodiment of this disclosure.

FIG. 2 shows an embodiment implementing the principles of the present disclosure. Some of the elements of FIG. 1 are present in this embodiment and they are given the same reference numbers.

The terminal 3000 includes a secure element 3300 that has means for executing certain functions, and specifically in this example an application 3310 or local server 3310 for managing trusted applications performed in the secure environment 3100. This local sever 3310 is capable of using security rules 3320 and cryptographic keys 3330 to active the application. It may be a Java server running on a virtual Java machine or a particular applet, e.g. a Java card applet.

By way of example the secure element may be a card having a microcircuit such as a SIM, a universal integrated circuit card (UICC), an embedded UICC (eUICC), a secure element (SE) or an embedded secure element (eSE).

The management application 3310 or local server 3310 replaces the remote server 1000 shown in FIG. 1. It is supplied by the trusted applications supplier that published the trusted applications in question. The trusted applications manager client 3110 acts as the relay between the management application 3310 and the trusted applications 3120 and 3125.

Specifically, the manager client 3110 communicates with the management application 3310 via a secure channel in order to obtain a management action by the trusted applications supplier that supplied the application in question. The exchanges between the secure environment 3100 (including the manager client 3110) and the secure element 3300 may, by way of example, be in the form of application protocol data unit (APDU) commands and responses in compliance with the ISO 7816-4 standard.

As before, if the trusted application is not available in the secure execution environment 3100, the management action comprises making the code of the application available to the terminal, which code is obtained in this example from a non-volatile memory of the secure element 3300 (not shown), or from a removable memory card (not shown) having secure access that can be accessed solely by the secure element 3300.

The management action may also comprise supplying an agreement to activate or block the application in question, 1030, 3120, or 3125. Obtaining such an agreement may involve verifying the rules 3320 and supplying cryptographic keys 3330 or a token, which may be a time stamp, or a combination of cryptographic keys and of a token. Thus, the rights over the application may be permanent or temporary. The manager client 3110 uses a key to perform encryption or decryption, e.g. in order to activate, unblock, update, personalize, eliminate, deactivate, or block the trusted application.

As before, a management action concerning the application as performed by the trusted application management application 3310 may consist in storing the activity or an activity type relating to the trusted application in order to keep a log of transactions or of activity, so as to enable the trusted applications supplier to perform statistics on the activity associated with the application or the activity associated with the user of the terminal.

The management action may also consist in personalizing a trusted application, in particular the secure operating system itself. Such personalization of the secure operating environment may be performed on the first occasion the terminal is started or after detecting that a new removable secure element has been inserted, or when requested by an application of the versatile environment. Such personalization of the versatile environment by a trusted application managed by a trusted service management application constitutes a service for guaranteeing the integrity of the terminal, since users recognize their own personalization parameters, in particular a secret shared between a user and the secure operating system, which secret is selected to guarantee to the user that the secure operating environment has not been subjected to modifications by a third party or by a malware application. The terminal integrity guarantee service is supplied by the authorities using the service management application.

In general, the management application 3310 is in charge of authorizing an operation of installing, activating, deblocking, updating, or personalizing the trusted application, or of causing the trusted application to be deleted, deactivated, or blocked, or of collecting information about an activity of the trusted application.

The secure element 3300 may also be configured to transmit an activity report to a remote trusted service manager server such as the remote server 1000 shown in FIG. 1, which report is prepared by the trusted services management application 3310. The report may include information about management action performed on the trusted applications (listing installations, activations, deblocking operations, updates or personalizations, and also deletions, deactivations, and blocking operations, in particular). Transmission may be performed periodically, or when particular circumstances trigger transmission, such as for example detecting good connection to the network.

Figure 3:
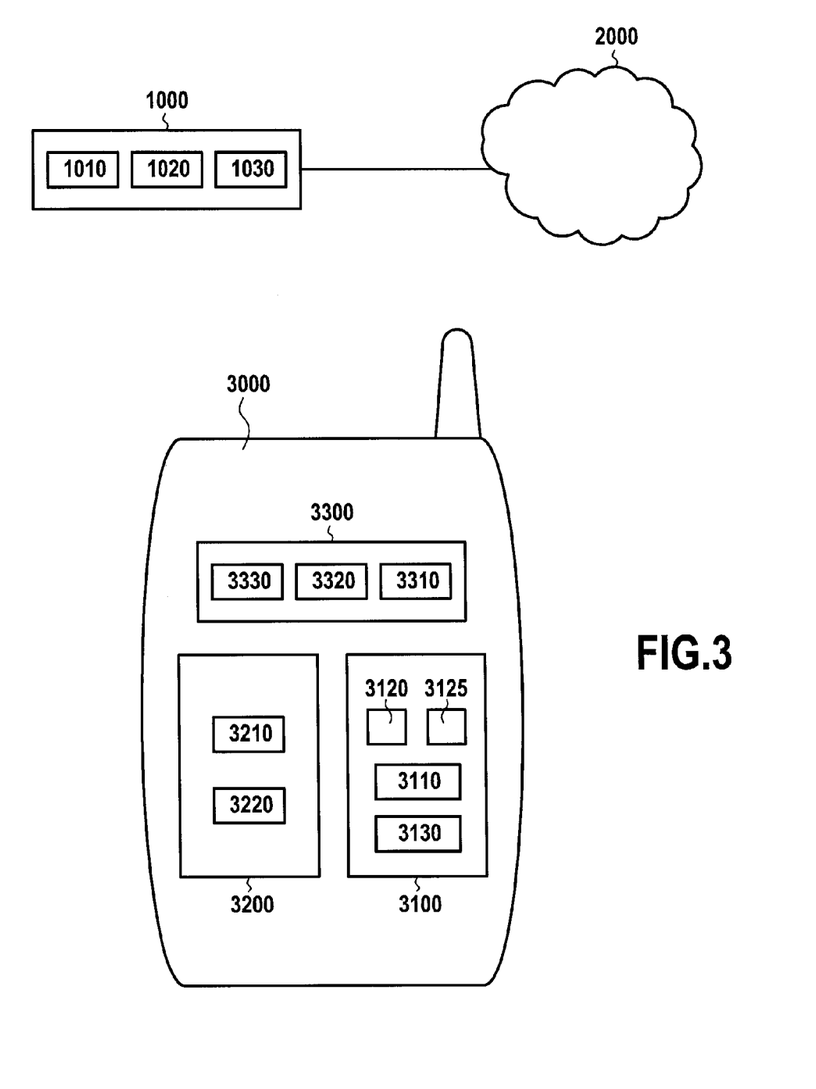
FIG. 3 shows another embodiment of this disclosure.

FIG. 3 shows a second embodiment implementing the principles of the present disclosure. Some elements in FIGS. 1 and 2 are present in this embodiment and they are given the same reference numbers.

The secure execution environment 3100 also includes a switch module 3130 for putting the applications manager 3110 into communication either with the remote server 1000 for managing trusted applications, that is accessible over the network via the network communications interface 3220, or else with the local application 3310 for managing trusted applications as contained in the secure element 3300.

The selection of one or the other may be undertaken using various criteria and rules. By way of example, the presence of a good quality connection to the network may cause the switch module 3130 to give precedence to the remote management server 1000 for performing the management action on the trusted application.

The availability of a management server of the trusted application supplier that published the trusted application in question over network providing a good quality connection may likewise be a criterion causing the switching network 3130 to give precedence to the remote management server 1000. Conversely, if the management server of the supplier is unavailable or if the network is not accessible, then it, is the local management application 3310 that is selected to perform the management action, on the trusted application in question.

In a context where a plurality of suppliers make a plurality of local management applications 3310 available for installing in the secure element, it may also be decided to give precedence to a local management application 3310 providing there is such an application that is associated with the trusted applications supplier that published or that manages the trusted application for which a management action is required. It is only when no local management application 3310 associated with the supplier is present in the secure element 3300 that the switch module 3130 switches to a remote server 1000 made available by the supplier.

In another embodiment, if a management application 3310 associated with the trusted applications supplier that published the trusted application in question is present in the secure element 3300, the switch module 3130 decides to out the management application 3310 into communication with the applications manager client 3110 even if network communication is available and a management server associated with the supplier is available on the network. This embodiment is particularly advantageous, since communication between the manager 3110 and the local management application 3310 is secure since it does not go via the network and it does not transit via the versatile execution environment 3200.

Figure 4:
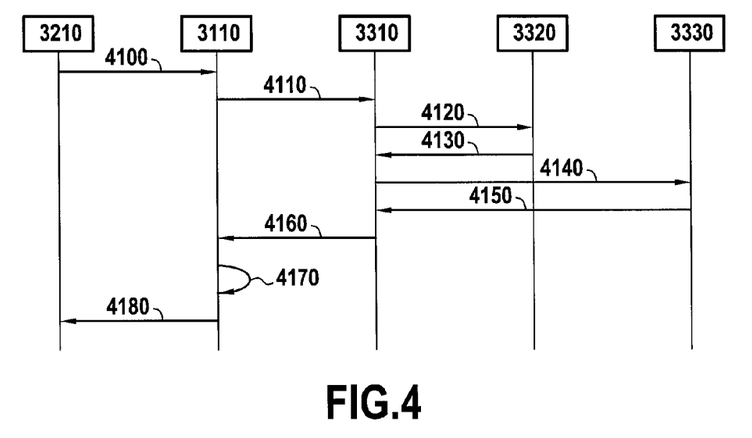
FIG. 4 shows an implementation of the principles described n this disclosure.

FIG. 4 shows the steps of a scenario for use of the FIG. 2 embodiment. During a step 4100, the versatile environment application 3210 makes a request to the trusted applications manager client 3110 for access to a trusted application. On observing that the application in question is not activated, the client 3110 makes an activation request to the management application 3310 of the secure element, during a step 4110. There follows a step 4120 of verifying authorization policy, with a response 4130 froze an application of the memory in which security rules 3320 are stored, and a step 4140 of requesting the cryptographic key for activating the trusted application, which key is returned in a response 4150 from an application 3330 of the memory storing these keys. Once this information has been obtained by the management application 3310, it forwards the keys needed for activation to the applications Manager client 3110 during a step 4160. The client 3110 activates the trusted application during a step 4170 and puts it into communication with the versatile environment application 3210 during a step 4180.

Figure 5:
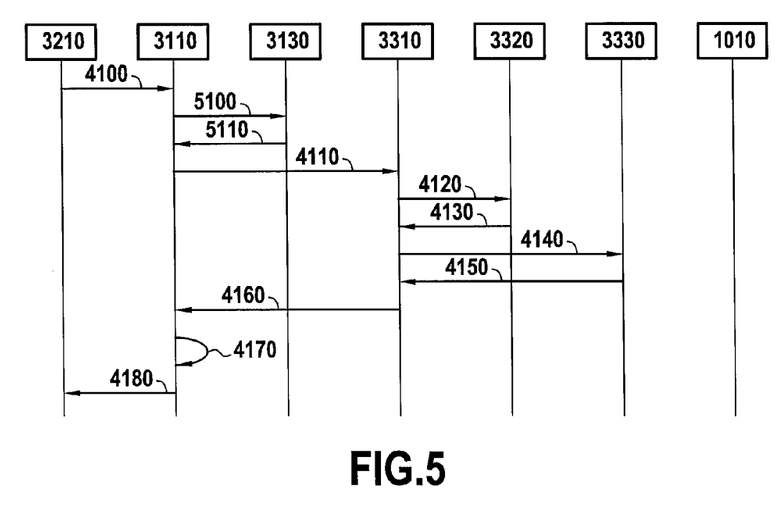
FIGS. 5 and 6 show other implementations of the principles described in this disclosure.

FIG. 5 shows the steps of a scenario for use of the embodiment of FIG. 3. Certain elements in FIG. 4 are present in this example and they are given the same reference numbers. After the versatile environment application 3210 has made a request with the applications manager client 3110 to be put into communication with a trusted application during the step 4100, the applications manager client 3110 interrogates the switch module 3130 during a step 5100 to determine who to address for the operations of managing the trusted application. In the scenario shown, the switch Module decides to switch the applications manager client 3110 to the local management application 3310 and gives it information in the form of a response 5110, and the subsequent exchanges are similar to those described in FIG. 4.

Figure 6:
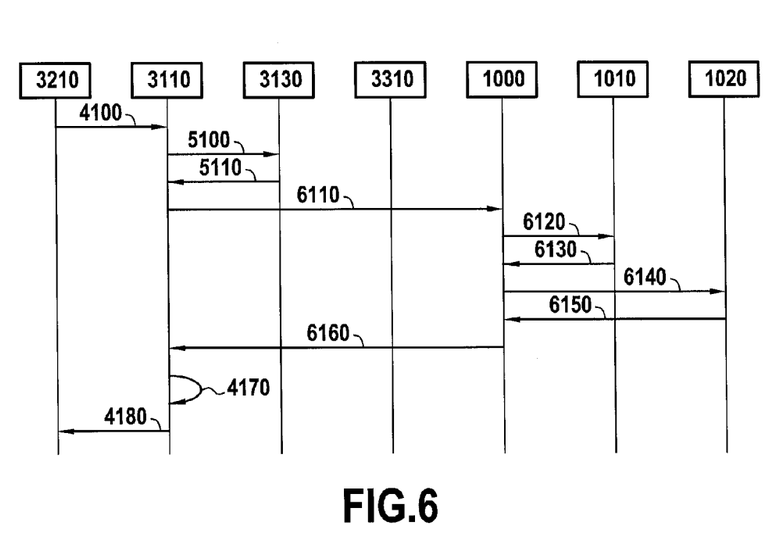

Alternatively, the switch module might switch the application manager client 3110 to the remote server 1010, as shown in FIG. 6. In this figure, some of the elements of FIGS. 4 and 5 are shown and they are given the save reference numbers. The steps 4110 to 4160 are replaced by steps 6110 to 6160 and they involve the remote server 1000 and its memories 1010 and 1020.

As in the embodiment of FIG. 2, the secure element 3300 may also be configured to send an activity report to a trusted service manager server such as the remote server 1000, which report is prepared by the trusted service management application 3310, as described above with reference to FIG. 2.

The invention is not limited to the embodiment described, but extends to any variants coming within the ambit of the scope of the claims.

In particular, with a secure element having sufficient calculation power, the trusted application may be executed in a variant in the secure element that, as mentioned above, is itself in charge of managing the trusted application. It is then not necessary to have a trusted applications manager client 3110, since its functions may be executed by the local application or by the local server 3310 for managing trusted services such that the client and the local server 3310 are the one and the same.

In certain variants, the trusted application may also be executed in a non-secure execution environment, such as the versatile environment. Furthermore, the applications manager client 3310 may manage application that are not trusted applications, in addition to managing trusted applications.

Furthermore, the means for communicating with the network need not be executed in a versatile execution environment, but they may be executed in their own specific execution environment, which environment is then dedicated to them, or in the execution environment that executes the trusted application.

What is claimed is:

1. A telecommunications terminal comprising:
   a network communications interface;
   a secure element comprising a trusted services management application configured to manage a trusted application of the telecommunications terminal;
   a processor; and
   a memory storing instructions that, when executed by the processor, cause the processor to:
      receive a request for management of the trusted application, wherein the request for management includes a management action corresponding to one of: installing, deleting, activating, deactivating, blocking, deblocking, updating, or personalizing the trusted application;
      determine, based on the management action included in the request for management, whether management of the trusted application is to be performed locally or remotely;
      switch the request for management of the trusted application to the trusted services management application upon determination that the management of the trusted application is to be performed locally; and
      switch the request for management of the trusted application to a remote trusted service manager server upon determination that the management of the trusted application is to be performed remotely,
      wherein the remote trusted service manager server is connected to the network communications interface via a telecommunications network,
      wherein the processor is further caused to:
         account for a quality of the connection between the telecommunications terminal and the remote trusted service manager in determining whether the management of the trusted application is to be performed locally or remotely, and when the request for management is switched to the trusted services management application, verify a security policy relating to the management action and perform the management action using a cryptographic key, and wherein an execution environment in which the trusted application is run includes an operating system under the control of which the trusted application is executed, wherein the operating system includes a secure start mechanism.

2. A telecommunications terminal according to claim 1, wherein the network communications interface operates in an execution environment distinct from an execution environment in which the trusted application is run.

3. A telecommunications terminal according to claim 1, wherein the trusted services management application is configured to authorize an installation, an activation, a deblocking operation, updating, or personalizing the trusted application or is configured to cause the trusted application to be deleted, deactivated, or blocked.

4. A telecommunications terminal according to claim 1, wherein the trusted services management application is configured to select information about an activity of the trusted application.

5. A telecommunications terminal according to claim 1, wherein an execution environment in which the trusted application is run includes a secure processor on which the trusted application is executed.

6. A telecommunications terminal according to claim 1, wherein an execution environment in which the trusted application is run includes a secure rewritable non-volatile memory storing instructions for executing the trusted application.

7. A telecommunications terminal according to claim 1, further including a versatile execution environment running at least one application suitable for requesting access to the trusted application.

8. A telecommunications terminal according to claim 1, wherein:
an execution environment in which the trusted application is run includes an operating system under the control of which the trusted application is executed, and
the telecommunications terminal further includes a versatile execution environment having a versatile operating system.

9. A telecommunications terminal according to claim 1, wherein the secure element is configured to transmit an activity report to a trusted service manager server, wherein the activity report is prepared by the trusted services management application.

10. A telecommunications terminal according to claim 1, wherein the secure element comprises a removable secure element from the group consisting of:
a microcircuit card; and
a universal integrated circuit card.

11. A telecommunications terminal according to claim 1, wherein the secure element comprises an embedded secure element that is integrated with the telecommunications terminal.

12. A telecommunications terminal according to claim 11, wherein the embedded secure element comprises an embedded universal integrated circuit card.

13. A telecommunications terminal according to claim 1, wherein the trusted application comprises one of the group consisting of:
an application for a payment service;
an application for a content supply service; and
an application for a service for guaranteeing the integrity of the telecommunications terminal.

14. A telecommunications terminal according to claim 1, further comprising:
an execution environment that is distinct from an execution environment of the secure element; and
wherein the trusted application is executed by the execution environment that is distinct from the execution environment of the secure element.

15. A method for managing a trusted application in a terminal, comprising:
receiving a request for management of a trusted application, wherein the request for management includes a management action corresponding to one of: installing, deleting, activating, deactivating, blocking, deblocking, updating, or personalizing the trusted application;
determining, based on the management action included in the request for management, whether management of the trusted application is to be performed locally or remotely;
switching the request for management to a trusted services management application contained in a secure element of the terminal, upon determination that the management of the trusted application is to be performed locally; and
switching the request for management to a remote trusted services manager, connected to the terminal via a network connection, upon determination that the management of the trusted application is to be performed remotely,
wherein the determining comprises accounting for a quality of the network connection between the terminal and the remote trusted service manager, and
wherein, when the request for management is switched to the trusted services management application, the method further comprises:
verifying a security policy relating to the management action; and
performing the management action using a cryptographic key, and
wherein the method further comprises verifying, by the secure element, that the terminal starts in a trusted state.

16. The method of claim 15, wherein receiving the request for management of the trusted application comprises receiving the request for management from an application running in a versatile execution environment of the terminal.

17. The method of claim 15, wherein said determining and switching steps are performed by the trusted services management application.

18. A system comprising:
a network communications interface;
a secure element comprising a trusted services management application configured to manage a trusted application of a telecommunications terminal;
a processor; and
a memory storing instructions that, when executed by the processor, cause the processor to:
receive a request for management of the trusted application, wherein the request for management includes a management action corresponding to one of: installing, deleting, activating, deactivating, blocking, deblocking, updating, or personalizing the trusted application;
determine, based on the management action included in the request for management, whether management of the trusted application is to be performed locally or remotely;

switch the request for management of the trusted application to the trusted services management application when the management of the trusted application is performed locally; and switch the request for management of the trusted application to a remote trusted service manager server when the management is performed remotely, wherein the remote trusted service manager server is connected to the network communications interface via a telecommunications network, wherein the processor is further caused to:

account for a quality of the connection between the telecommunications terminal and the remote trusted service manager in determining whether the management of the trusted application is to be performed locally or remotely, and when the request for management is switched to the trusted services management application, verify a security policy relating to the management action and perform the management action using a cryptographic key, and wherein the secure element is configured to verify that the telecommunications terminal starts in a trusted state.

* * * * *